Patented Nov. 17, 1936

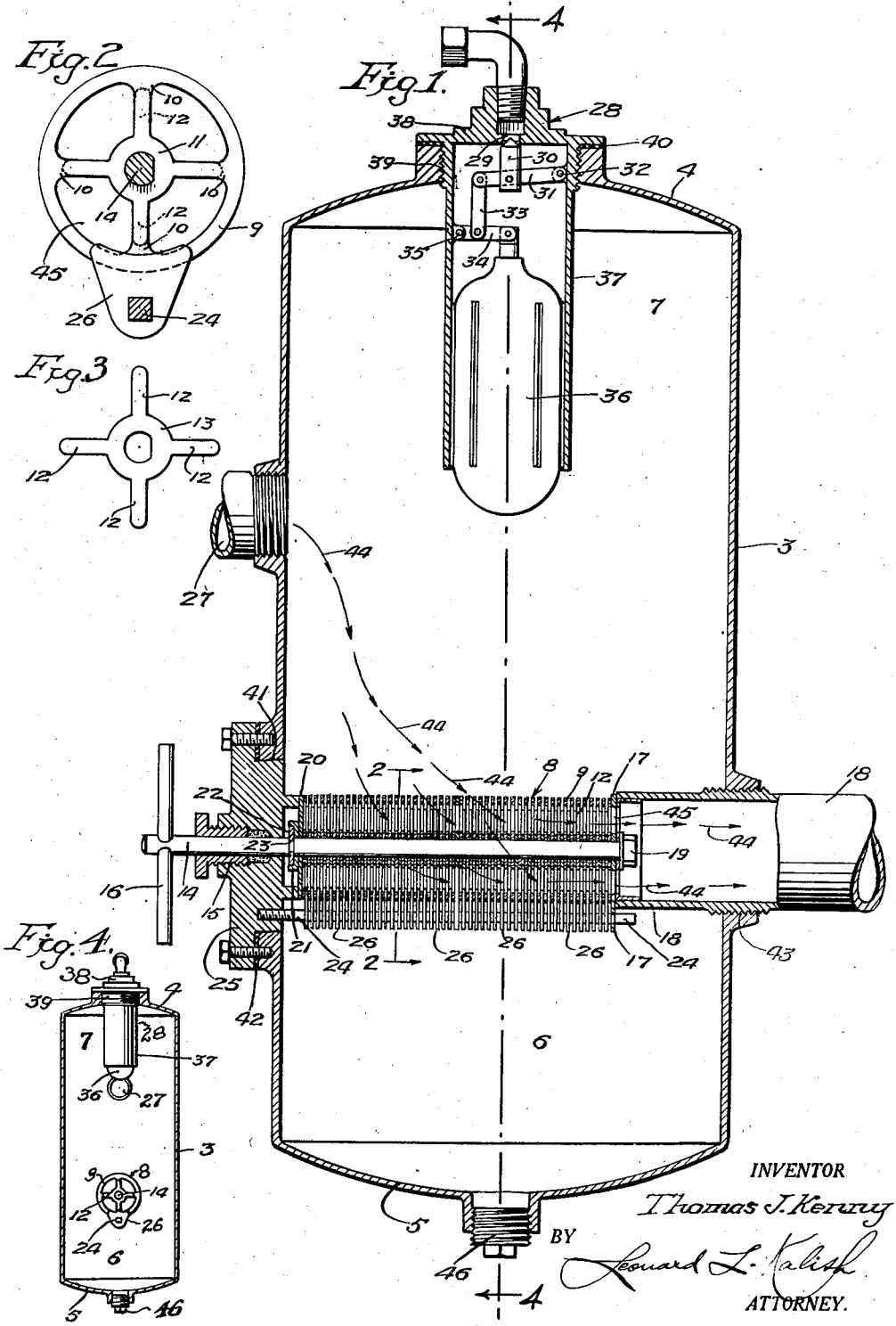
Nov. 17, 1936.  T. J. KENNY  2,061,517
APPARATUS FOR SEPARATING AIR AND SOLIDS FROM LIQUIDS
Filed July 23, 1935
INVENTOR
Thomas J. Kenny
BY Leonard L. Kalish
ATTORNEY.

2,061,517

UNITED STATES PATENT OFFICE 2,061,517

APPARATUS FOR SEPARATING AIR AND SOLIDS FROM LIQUIDS

Thomas J. Kenny, Elkins Park, Pa., assignor to Sheffler-Gross Company Inc., Philadelphia, Pa., a corporation of Pennsylvania Application July 23, 1935, Serial No. 32,710

6 Claims. (Cl. 183—3)

The present invention relates to a liquid separating apparatus and it relates more particularly to apparatus for simultaneously separating both solid matter as well as gaseous matter such as air, from liquids while such liquids are flowing or while such liquids are in motion.

In the handling of such liquids as fuel oil, gasoline, etc., it becomes important to eliminate both air and dirt or solid matter from the oil or gasoline as it flows through the pipes and, for instance, from the storage tank or from the tank truck or tank car to some other vessel where it is received.

An object of the present invention is to provide a unitary and compact structure which will more effectively eliminate air and gaseous matter and will at the same time also separate dirt and foreign solid matter from the liquid.

With the above and other objects in view, the present invention consists of a novel combination of air and dirt filtering or separating means, air-trapping means and air-releasing means, and dirt-trapping means, whereby a simultaneous elimination of air and dirt is effected efficiently and more completely.

The present invention further consists of other novel features and details of construction, all of which will appear more fully from the following detailed description and accompanying drawing.

For the purpose of illustrating the invention, there is shown in the accompanying drawing, one form thereof which is at present preferred, since the same has been found in practice to give satisfactory and reliable results, although it is to be understood that the various instrumentalities of which the invention consists can be variously arranged and organized and that the invention is not limited to the precise arrangement and orginization of the instrumentalities as herein shown and described.

Referring to the drawing in which like reference characters indicate like parts:

Figure 1 represents a vertical median sectional view of the apparatus embodying the present invention.

Figure 2 represents a section on line 2—2 of Figure 1 on an enlarged scale.

Figure 3 represents a plan view of one of the spacer members.

Figure 4 represents a vertical sectional assembly view on a much reduced scale, taken generally on line 4—4 of Figure 1.

According to the present invention, a generally closed housing 3 is provided of any suitable shape and size, as for instance, the generally cylindrical metallic vessel indicated in the drawing, having top end member 4 and bottom end member 5, which vessel may be formed of sheet metal with its ends formed integrally or welded thereto or which may be formed of casting, or otherwise formed. In the bottom of the housing, a dirt-collecting or solids-collecting chamber 6 is provided, while in the top of the housing 3, an air-collecting chamber 7 is provided.

Intermediate the lower solids-collecting chamber 6 and the upper air-collecting chamber 7, an air and solids separating device is provided, designated generally by the numeral 8, comprising a series of closely spaced flat sheet metal annuli 9 which are carried by a plurality of radial spokes 10 from a central sheet metal hub 11 formed integrally therewith, which annuli are maintained in predetermined spaced relation to each other by the sheet metal separator spokes 12 carried upon suitable sheet metal hubs 13 formed integrally with the spokes 12;—said annuli 9 with their integral spokes 10 and hubs 11 and said separator spokes 12 with their integral hubs 13 being supported upon and being keyed to a common operating stem 14, the outer end of which passes through the stuffing gland 15 of any suitable construction, and terminates in an external operating handle 16, and the inner end of which is journalled in the similarly shaped and similarly perforated stationary terminal plate 17, carried in rigid or stationary relation to the discharge pipe or orifice 18. The discs or annuli 9 and the spacers 12 are clamped tightly in alignment with each other by means of the nut 19 which is threaded on the free end of the operating rod or stem 14, and the solid end plate 20 which in turn is held by the flange 21 secured to the stem 14 against axial displacement by any suitable lock ring or equivalent device 22, engaging the annular groove 23 in the stem 14.

The stationary rod 24 is supported at one end in the closure block or cap 25 which carries the stuffing gland 15 and is supported at its other end in the perforated stationary terminal plate 17. The rod 24 carries a series of scraper plates 26 which project between the annuli 9, and fit snugly therebetween, as indicated in Figure 1, so that upon a turning of the handle 16 one or more revolutions, any solid matter which may collect between the flat surface of the adjacent annuli 9, will be forced out and deposited into the bottom chamber 6.

A suitable inlet 27 is provided for the admission of liquids.

In the upper air collecting chamber 7, a float-controlled air-release valve designated generally by the numeral 28, is provided, comprising a discharge or relief port 29, constituting a suitable valve seat, and a movable valve closure member 30 in operative juxtaposition thereto carried by any suitable operating mechanism, as for instance, the lever 31 pivoted at 32, which in turn is connected through a link 33 to another lever 34 pivoted at 35, and to which the hollow metallic float or other suitable float 36 is pivotally connected. A guide shell 37 loosely surrounds the float 36 for guiding it in a more or less confined path and for allowing the air to pass by the float towards the relief port 29.

The float operated air-relief valve designated generally by the numeral 28 may be formed as a more or less removable unit upon the closure member 38, which is screw-threadedly secured to the flanged opening 39 in the upper end of the housing 3 with any suitable packing disc or washer 40 interposed to effect an air-tight seal.

The closure member 25 may be bolted to the flanged opening 41 in the side of the housing 3, or it may be screw-threadedly or otherwise secured thereto with a suitable packing washer or gasket 42 for effecting an air-tight seal. Similarly, the outlet member 18 may be screw-threadedly or otherwise secured to the outlet 43 with its end in abutting relation to the stationary terminal plate or member or disc 17.

The device of the present invention shown in Figure 1 is adapted for use in any pipe line, as for instance, the pipe line leading from a stationary or transitory storage tank to a flow meter and to some other storage space. The device of the present invention is so installed that the flow will be in the direction of the arrows 44. The liquid flowing in the direction of the arrows 44 can enter only between the plurality of annuli 9 which are spaced from each other by the spacers 12, and then out through the openings 45 within said annuli and between the annuli and the radial supporting spokes thereof, and out through the corresponding openings 45 in the terminal disc 17 and out through the discharge pipe 18. The spacing between the annuli 9 can be varied according to the thickness of the spacer members 12—13 and the closeness of the spacing determines the degree of separation of solids and air.

Owing to the fact that the liquid in passing from the outer periphery of the annuli 9 to the inner periphery of the annuli 9 (to the open spaces 45) is forced to traverse a substantial distance, to wit, the radial depth or width of the annuli 9, any air (or other gas) which is entrapped in the liquid is forced out of the liquid or separated out of the liquid more completely so that a more complete and effective separation and elimination of air through the valve 28 is possible while the liquid is flowing through the system.

In the embodiment of the present invention shown herein, the solids as well as the gases are both separated from the liquid by the same elements and in the same general direction, that is, gases and solids both tend to stay on the outside of the stack of discs 9;—the solids, however, collecting in the lower chamber 6, and the air and gases being collected in the upper chamber 7. While the air and other gases are automatically eliminated by the float-controlled valve 28 (according to the drop in the liquid level within the housing 3 by the collection of gas in the chamber 7), the solids can be eliminated from time to time by the removal of the screw plug 46.

By reason of the fact that the solids can be frequently eliminated or the strainer elements cleaned without an actual removal of the filtering or straining elements from the device, a finer spacing of the filter elements is made possible with the result that a more complete separation, not only of dirt, but also of air, is made possible so that a more complete elimination of air through the valve 28 is made possible. Thus, it is well known that any finely spaced straining or filtering element has to be cleaned more often because it clogs more quickly with solids. Hence, with filtering elements which must be removed from the casing in order to clean them, a fine filter is not practicable because it would have to be removed too often to be commercially feasible. Hence, a coarse filter would have to be used, with the result that air could not be separated and eliminated as completely.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. An air and dirt separator comprising, in combination, a generally closed housing having a liquid inlet and a liquid outlet, and having a lower dirt-collecting chamber and an upper air-collecting chamber, a disc filter comprising a plurality of closely spaced filter discs intermediate said lower dirt-collecting chamber and upper air-collecting chamber, and operatively interposed between said inlet and outlet; with the outer peripheries of said filter discs exposed to the in-flow, and the inner peripheries of the discs in the direction of the out-flow, means extending through the housing and in sealed relation thereto for rotating said filter discs in unison, a plurality of stationary cleaning members intermediate adjacent filter discs, an air relief valve in communication with said air-collecting chamber, and means within said air-collecting chamber and responsive to the liquid level therein for actuating said air relief valve.

2. A device for separating air and dirt from liquids comprising a housing having a dirt-collecting chamber at the bottom thereof and having an air-collecting chamber at the top thereof in generally freely communicating relation to each other, a liquid inlet and a liquid outlet in said housing, a filter disposed between said dirt-collecting chamber and said air-collecting chamber and operatively interposed between said liquid inlet and liquid outlet and including closely spaced parts adapted to separate air as well as solids from the liquid flowing therethrough in the same general direction, means operable exteriorly of said housing for dislodging clogging solids from said filter, an air relief valve in communication with said air chamber and means disposed within said air chamber and responsive to the liquid level therein for actuating said air relief valve.

3. An air and dirt separator for liquids comprising, in combination, a generally closed casing having a liquid inlet and a liquid outlet, an air and dirt filter in the casing comprising means operatively interposed between the inlet and outlet including closely spaced parts adapted to exclude air and retain dirt carried by the liquid, means associated with the filter for cleaning the filter of retained dirt, means operable from the exterior of the casing for operating said cleaning means, an air-collecting chamber in the upper portion of the casing, above the filter, liquid level responsive means for releasing air from said chamber without releasing liquid therethrough, and a dirt-collecting chamber in the lower part of the casing, below the filter and said outlet, for receiving dirt cleaned from the filter.

4. An air and dirt separator for liquids comprising, in combination, a generally closed casing having a liquid inlet and a liquid outlet, an air and dirt filter in the casing comprising means operatively interposed between the inlet and outlet including closely spaced parts adapted to exclude air and retain dirt carried by the liquid, means associated with the filter for cleaning the filter of retained dirt, means operable from the exterior of the casing for operating said cleaning means, an air-collecting chamber in the upper portion of the casing, above the filter, liquid level responsive means for releasing air from said chamber without releasing liquid therethrough, and a sump in the lower part of the casing, below the filter and said outlet, communication in the casing between said sump and the inlet side of said filter being open whereby said sump receives dirt cleaned from said filter.

5. An air and dirt separator for liquids comprising, in combination, a generally closed casing having a liquid inlet and a liquid outlet, an air and dirt filter in the casing comprising means operatively interposed between the inlet and outlet and spaced from a side wall of the casing, said filter including closely spaced parts adapted to exclude air and retain dirt carried by the liquid, means associated with the filter for cleaning the filter of retained dirt, means operable from the exterior of the casing for operating said cleaning means, an air-collecting chamber in the upper portion of the casing, above the filter, liquid level responsive means for releasing air from said chamber without releasing liquid therethrough, and a dirt-collecting chamber in the lower part of the casing, below the filter and said outlet, for receiving dirt cleaned from the filter.

6. An air and dirt separator for liquids comprising, in combination, a generally closed casing having a liquid inlet and a liquid outlet, an air and dirt filter in the casing comprising means operatively interposed between the inlet and outlet and having a plurality of narrow interstices for excluding air and retaining dirt carried by the liquid, means associated with the filter and movable relatively thereto to clean the interstices of retained dirt, means operable from the exterior of the casing for effecting said relative movement, an air-collecting chamber in the upper portion of the casing, above the filter, an air relief valve in communication with the upper chamber, means in said chamber responsive to the liquid level therein for operating said valve, and a dirt-collecting chamber in the lower part of the casing, below the filter, for receiving dirt cleaned therefrom.

THOMAS J. KENNY.